(12) United States Patent
Tajima et al.

(10) Patent No.: US 6,849,983 B2
(45) Date of Patent: Feb. 1, 2005

(54) ROTARY MACHINE HAVING BYPATH MAGNETIC PATH BLOCKING MAGNETIC BARRIER

(75) Inventors: Fumio Tajima, Juo (JP); Yutaka Matsunobu, Hitachinaka (JP); Masashi Kitamura, Mito (JP); Kiyoshi Yamaguchi, Mito (JP); Osamu Koizumi, Ibaraki (JP); Suetaro Shibukawa, Hitachinaka (JP); Shigeki Morinaga, Hitachi (JP); Yukinori Taneda, Yokohama (JP); Hideki Nakamura, Yasugi (JP); Hakaru Sasaki, Matsue (JP); Shinichiro Yokoyama, Yasugi (JP)

(73) Assignees: Hitachi, Ltd., Tokyo (JP); Hitachi Metals, Ltd., Tokyo (JP)

( * ) Notice: Subject to any disclaimer, the term of this patent is extended or adjusted under 35 U.S.C. 154(b) by 0 days.

(21) Appl. No.: 09/796,716

(22) Filed: Mar. 2, 2001

(65) Prior Publication Data

US 2001/0026108 A1 Oct. 4, 2001

(30) Foreign Application Priority Data

Mar. 3, 2000 (JP) ........................................ 2002-058534

(51) Int. Cl.[7] ......................... H02K 17/00; H02K 21/12; H02K 16/02; H02K 19/02; H02K 19/10
(52) U.S. Cl. .................. 310/166; 310/156.53; 310/168; 310/261
(58) Field of Search ............... 310/152, 156.01–156.84, 310/10, 40 R, 166, 168, 261

(56) References Cited

U.S. PATENT DOCUMENTS 3,671,789 A * 6/1972 Menzies ...................... 310/163
3,679,924 A * 7/1972 Menzies ...................... 310/163
3,721,844 A * 3/1973 Fong .......................... 310/166

(List continued on next page.)

FOREIGN PATENT DOCUMENTS

| EP | 0678967 A1 | 10/1995 | | |
|---|---|---|---|---|
| GB | 2204742 | 11/1988 | | |
| JP | 100030 | 11/1932 | | |
| JP | 02165427 A | * | 6/1990 | .......... G11B/7/085 |
| JP | 4-128074 | 4/1992 | | |
| JP | 9-93885 | 4/1997 | | |
| JP | 09-093885 | 4/1997 | | |
| JP | 9-157802 | 6/1997 | | |
| JP | 10-150754 | 6/1998 | | |
| JP | 10150754 A | * | 6/1998 | .......... H02K/19/10 |
| JP | 10-271779 | 10/1998 | | |
| JP | 2000-104142 | 4/2000 | | |
| WO | 9840952 | 9/1998 | | |

OTHER PUBLICATIONS

Copy of the Search Report.
Electric Society, "Magnetic Field Analysis and Prototype Experiment of Flux Barrier Type Relucatance Motor Using Slit Rotor", 1996, pp. 694–701.
Office Action JP3184/184208.
Japanese office action dated Nov. 12, 2002.

*Primary Examiner*—Karl Tamai
*Assistant Examiner*—Pedro J. Cuevas
(74) *Attorney, Agent, or Firm*—Crowell & Moring LLP

(57) ABSTRACT

The rotary machine is composed of the rotor having magnetic poles and the stator having the stator yoke portion constituting the iron core tooth portion wound by the stator winding and the flux flow path of the magnetic poles. The rotor is composed of a metallic material having ferromagnetic parts and non-magnetic parts as a member and has a magnetic barrier area composed of the slit portion for blocking the bypath magnetic path in the periphery of the rotor and the non-magnetic parts. The rotary machine that produced torque can be increased sufficiently and the mechanical strength during high-speed running is improved and an electrical vehicle using it.

17 Claims, 10 Drawing Sheets

U.S. PATENT DOCUMENTS

| | | | | |
|---|---|---|---|---|
| 4,139,790 A | * | 2/1979 | Steen | 310/156.83 |
| 4,658,165 A | * | 4/1987 | Vanderschaeghe | 310/156.57 |
| 4,663,551 A | * | 5/1987 | Weh et al. | 310/12 |
| 4,888,513 A | * | 12/1989 | Fratta | 310/166 |
| 4,924,130 A | * | 5/1990 | Fratta | 310/156.53 |
| 5,010,267 A | * | 4/1991 | Lipo et al. | 310/162 |
| 5,191,256 A | * | 3/1993 | Reiter et al. | 310/156.38 |
| 5,296,773 A | * | 3/1994 | El-Antably et al. | 310/106 |
| 5,378,953 A | * | 1/1995 | Uchida et al. | 310/156.59 |
| 5,510,662 A | * | 4/1996 | Tanimoto et al. | 310/156.53 |
| 5,801,478 A | * | 9/1998 | Nashiki | 310/162 |
| 5,811,904 A | | 9/1998 | Tajima et al. | 310/156 |
| 5,818,140 A | * | 10/1998 | Vagati | 310/185 |
| 5,831,367 A | * | 11/1998 | Fei et al. | 310/12 |
| 5,832,789 A | * | 11/1998 | Kinto et al. | 74/421 A |
| 5,841,212 A | * | 11/1998 | Mita et al. | 310/156 |
| 5,845,732 A | * | 12/1998 | Taniguchi et al. | 180/65.6 |
| 5,893,205 A | * | 4/1999 | McClelland | 29/598 |
| 5,903,080 A | * | 5/1999 | Nashiki et al. | 310/168 |
| 5,935,722 A | * | 8/1999 | Moorhead et al. | 428/694 B |
| 5,945,760 A | * | 8/1999 | Honda et al. | 310/156.53 |
| 5,973,435 A | * | 10/1999 | Irie et al. | 310/263 |
| 6,008,559 A | | 12/1999 | Asano et al. | 310/156 |
| 6,064,134 A | * | 5/2000 | El-Antably et al. | 310/156.21 |
| 6,072,256 A | * | 6/2000 | Shon et al. | 29/598 |
| 6,121,706 A | * | 9/2000 | Nashiki et al. | 310/152 |
| 6,225,724 B1 | * | 5/2001 | Toide et al. | 310/216 |
| 6,259,181 B1 | * | 7/2001 | Kawano et al. | 310/162 |
| 6,271,616 B1 | * | 8/2001 | Akemakou | 310/152 |
| 6,285,104 B1 | * | 9/2001 | Nashiki | 310/184 |
| 6,288,460 B1 | * | 9/2001 | Fakult et al. | 310/179 |
| 6,376,956 B1 | * | 4/2002 | Hosoya | 310/154.17 |
| 6,392,324 B1 | * | 5/2002 | Kuwahara | 310/156.11 |
| 6,437,473 B1 | * | 8/2002 | Mobius et al. | 310/156.21 |
| 6,492,754 B1 | * | 12/2002 | Weiglhofer et al. | 310/156.08 |
| 6,509,667 B1 | * | 1/2003 | El-Antably et al. | 310/261 |
| 6,548,932 B1 | * | 4/2003 | Weiglhofer et al. | 310/156.19 |
| 6,630,764 B1 | * | 10/2003 | Dubee et al. | 310/177 |
| 6,664,688 B2 | * | 12/2003 | Naito et al. | 310/156.01 |
| 6,674,205 B2 | * | 1/2004 | Biais et al. | 310/156.53 |
| 6,675,460 B2 | * | 1/2004 | Reiter et al. | 29/596 |
| 6,684,483 B2 | * | 2/2004 | Rahman et al. | 29/596 |
| 6,713,923 B2 | * | 3/2004 | Hino et al. | 310/156.56 |

* cited by examiner

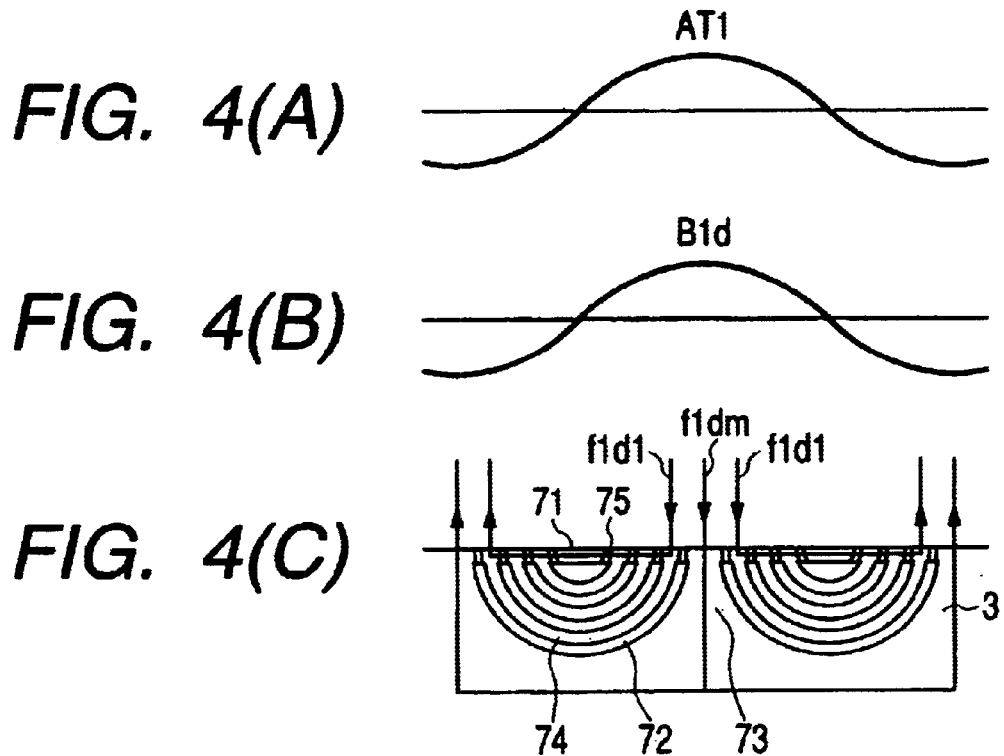
FIG. 4(A)
FIG. 4(B)
FIG. 4(C)
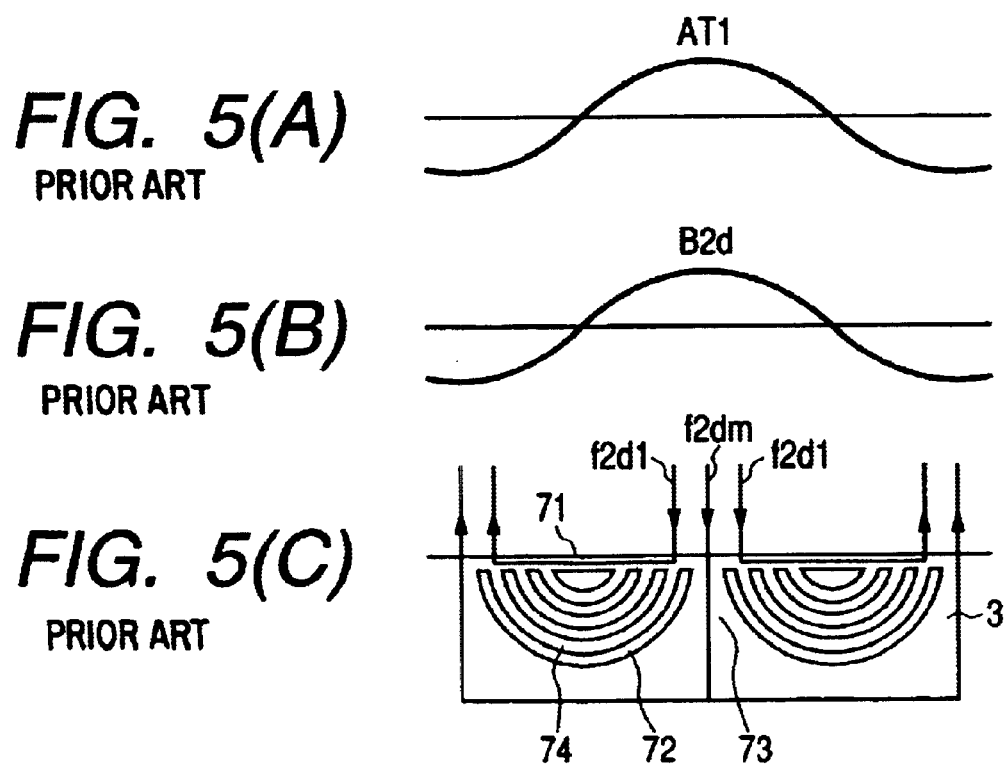
FIG. 5(A) PRIOR ART
FIG. 5(B) PRIOR ART
FIG. 5(C) PRIOR ART

ROTARY MACHINE HAVING BYPATH MAGNETIC PATH BLOCKING MAGNETIC BARRIER

BACKGROUND OF THE INVENTION

1. Field of the Invention

The present invention relates to a rotary machine and an electrical vehicle using it and more particularly to a reluctance type rotary machine suitable for an electrical vehicle and an electrical vehicle using it.

2. Prior Art

Recently, a motor used for an electrical vehicle such as an electric car or a battery fork is required to be small-sized, light in weight, and highly efficient. Therefore, as a driving motor of an electrical vehicle, a brushless motor (reluctance motor) using 1) a permanent magnet or 2) reluctance is most suitable. Particularly, as compared with a permanent magnet type motor using a highly efficient permanent magnet, although a reluctance motor is slightly low in efficiency and torque, it is almost equal to a permanent magnet type motor using a ferrite magnet and has an advantage that there are no problems imposed such as dependence on temperature of the characteristics and demagnetization of the magnet.

A first conventional reluctance motor, for example, as described in Electric Society, June Issue, 1996, "Magnetic Field Analysis and Prototype Experiment of Flux Barrier Type Reluctance Motor Using Slit Rotor", has a structure that a rotor is composed of a magnetic substance such as a silicone steel plate, and the plate is laminated in the axial direction, and several layers of non-magnetic slits are installed in the direction from the center of one magnetic pole (or may be called a salient pole) of the rotor to the center of another magnetic pole. By use of such a structure, the ratio Xd/Xq of the reluctance (Xd) at the magnetic pole center (or may be called salient pole center) to the reluctance (Xq) between the magnetic poles (or may be called between the salient poles) which is a most important factor of the reluctance motor can be increased, that is, the produced torque of the motor can be increased.

A second conventional reluctance motor, for example, as described in Japanese Patent Application Laid-Open 9-93885, uses a material that the ferromagnetic part and non-magnetic part coexist so as to ensure the mechanical strength which is a defect of a flux barrier type reluctance motor.

However, in the first conventional reluctance motor, although the ratio Xd/Xq of the reluctance (Xd) at the magnetic pole center to the reluctance (Xq) between the magnetic poles can be increased compared with a general reluctance type rotary machine, since there is a magnetic part in the outer periphery, leakage flux flows until it is saturated. Due to the leakage flux, Xq cannot be decreased sufficiently, and Xd/Xq cannot be increased, and the produced torque cannot be increased sufficiently. To decrease the leakage flux, it is necessary to reduce the thickness of the peripheral bridge. However, when the bridge thickness is reduced, a problem arises that the mechanical strength during high-speed running is not sufficient.

In the conventional second reluctance motor, since the rotor is integrated, the mechanical strength can be improved, though the magnetic permeability of the non-magnetic part cannot be reduced like that of air. Therefore, a problem arises that the leakage flux increases and the ratio Xd/Xq, that is, the produced torque cannot be increased sufficiently.

SUMMARY OF THE INVENTION

An object of the present invention is to provide a rotary machine that produced torque can be increased sufficiently and the mechanical strength during high-speed running is improved and an electrical vehicle using it.

(1) To accomplish the above object, the present invention is a rotary machine composed of a rotor having magnetic poles and a stator having a stator yoke portion constituting the iron core tooth portion wound by the stator winding and the flux flow path of the magnetic poles, in which the rotor is composed of a metallic material having ferromagnetic parts and non-magnetic parts as a member and the rotor has a magnetic barrier area for blocking the bypath magnetic path in the periphery of the rotor.

By use of such a constitution, the ratio of the reluctance of the axis d to the reluctance of the axis q is increased, and the produced torque is increased, and the mechanical strength during high-speed running can be improved.

(2) In (1) mentioned above, the magnetic barrier area is preferably formed by magnetic air gaps formed by the slit portion and the non-magnetic parts of the aforementioned metallic material which are arranged from the slit portion to the surface of the rotor.

(3) In (1) mentioned above, a plurality of internal magnetic barrier areas mentioned above are preferably formed in the rotor.

(4) In (2) mentioned above, it is preferable that the slit portion constitutes the magnetic salient pole of the rotor, and the non-magnetic parts are positioned on the air gap side, and the slit portion is arranged on the opposite side of the air gap side of the rotor.

(5) In (2) mentioned above, the slit portion and the non-magnetic parts are preferably formed continuously.

(6) In (2) mentioned above, a concavity smaller than the outermost periphery of the rotor is installed in the periphery of the non-magnetic parts on the air gap side.

(7) In (1) mentioned above, the rotor preferably has a permanent magnet as a part of it.

(8) Further, to accomplish the above object, the present invention is an electrical vehicle using a rotary machine for driving wheels which is composed of a rotor having magnetic poles and a stator having a stator yoke portion constituting the iron core tooth portion wound by the stator winding and the flux flow path of the magnetic poles, in which the rotor of the rotary machine is composed of a metallic material having a ferromagnetic part and a non-magnetic part as a member and the rotor has a magnetic barrier area for blocking the bypath magnetic path in the periphery of the rotor.

By use of such a constitution, the travel distance of one charging of an electrical vehicle can be extended.

BRIEF DESCRIPTION OF THE DRAWINGS

FIG. 4 is an illustration showing the principle of a reluctance type rotary machine of an embodiment of the present invention.

FIG. 5 is an illustration showing the principle of a reluctance type rotary machine of the conventional system.

DESCRIPTION OF THE INVENTION

The constitution and operation of the rotary machine of an embodiment of the present invention will be explained hereunder with reference to FIGS. 1 to 7.

Firstly, the constitution of the rotary machine of this embodiment will be explained by referring to FIGS. 1 to 3.

Figure 1:
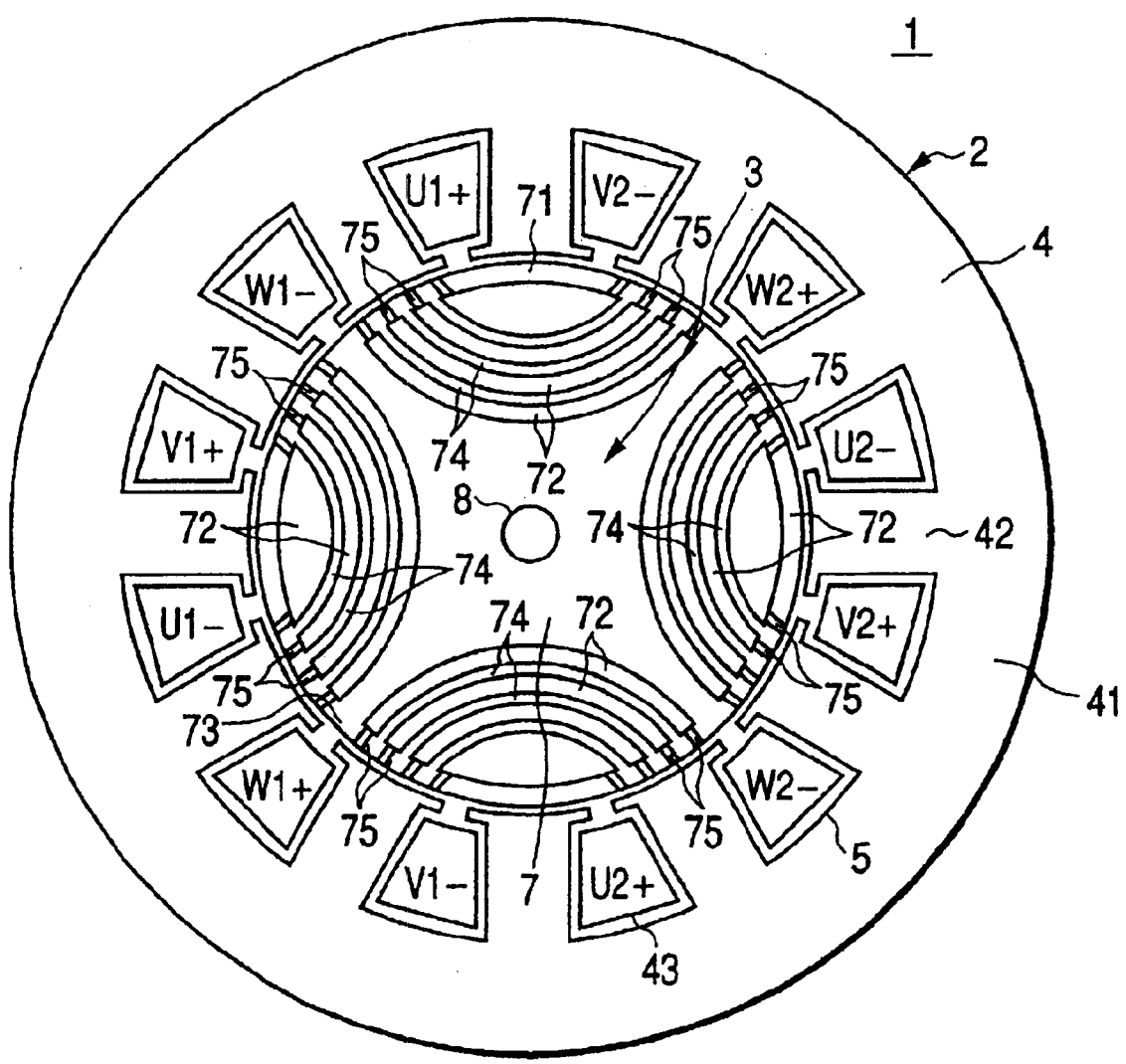
FIG. 1 is a cross sectional view showing the constitution of a rotary machine of an embodiment of the present invention.
Figure 2:
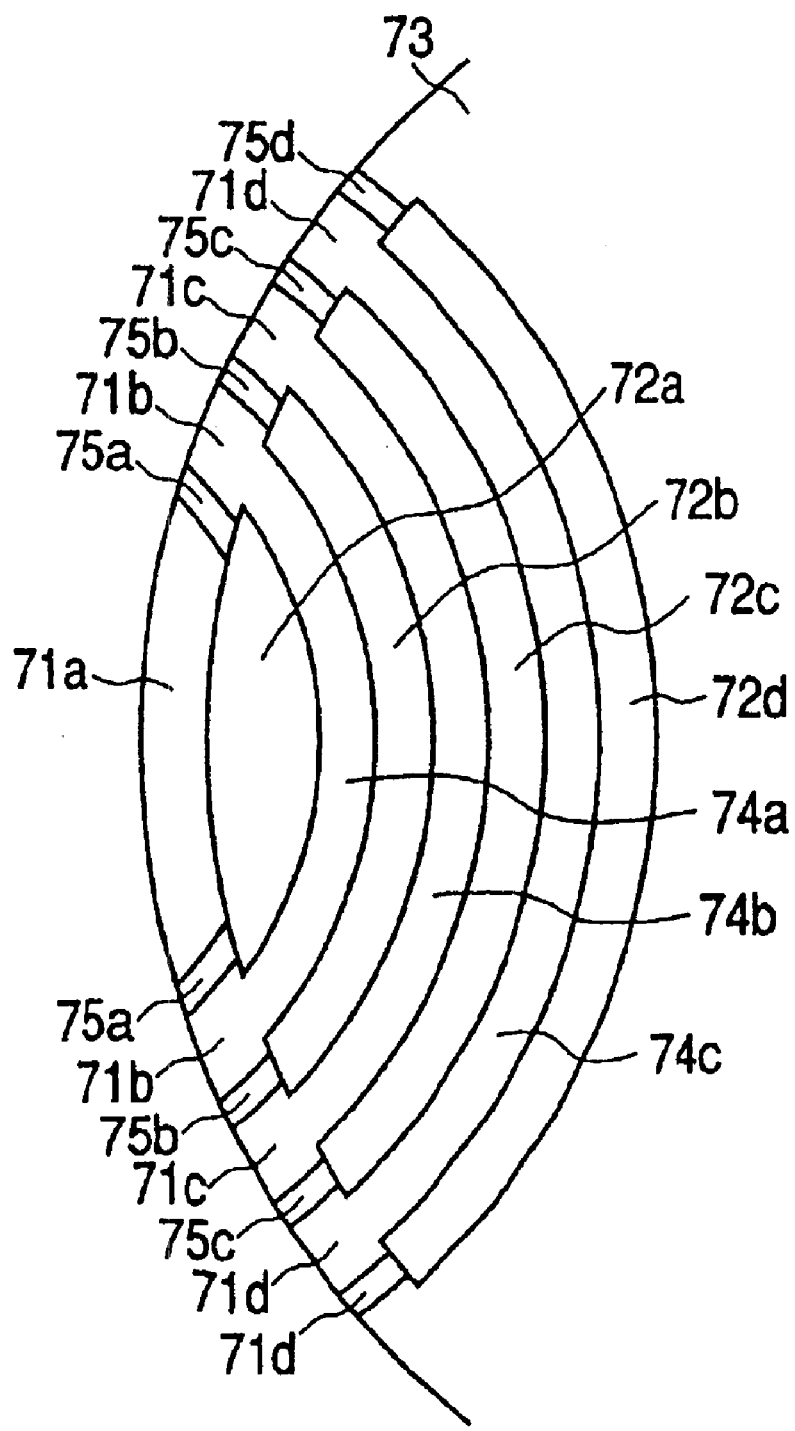
FIG. 2 is an enlarged view of the essential section of FIG. 1.
Figure 3:
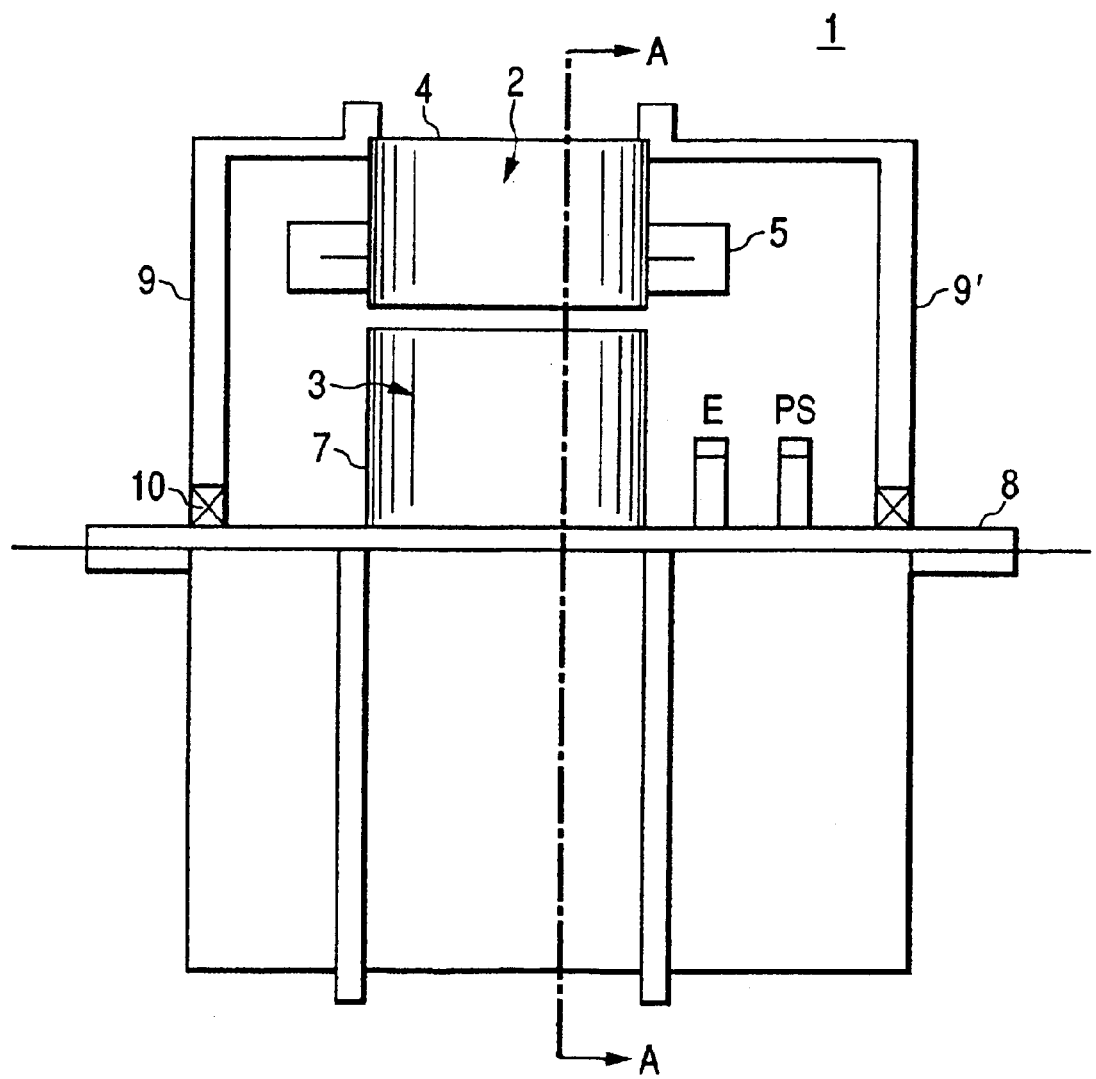
FIG. 3 is a front view showing a partial section showing the constitution of a rotary machine of an embodiment of the present invention.

FIG. 1 is a cross sectional view showing the constitution of the rotary machine of an embodiment of the present invention, and FIG. 2 is an enlarged view of the essential section shown in FIG. 1, and FIG. 3 is a front view showing a partial section showing the constitution of the rotary machine of an embodiment of the present invention. FIG. 1 is a cross sectional view of A–A' shown in FIG. 3.

An example of a rotary machine that a stator has a winding structure of distributed winding and a rotor has four salient poles will be explained hereunder.

As shown in FIGS. 1 and 3, a reluctance type rotary machine 1 has a stator 2, a rotor 3, and an end bracket 9. The stator 2 has a stator iron core 4 and a stator winding 5. The stator iron core 4 is composed of a circular ring-shaped yoke 41 and iron core tooth portions 42. A slot 43 for housing the stator winding 5 is installed between neighboring iron core tooth portions 42.

U1+, U1−, U2+, and U2− are connected to the U phase of the stator winding 5, V1+, V1−, V2+, and V2− to the V phase, and W1+, W1−, W2+, and W2− to the W phase. A suffix 1 indicates a stator winding number and + and − indicate winding directions of the stator winding 5 respectively. In this embodiment, an example of 4 poles is indicated in accordance with the number of salient poles of the rotor.

The rotor 3 has a rotor iron core 7 composed of a magnetic substance and a shaft 8. In the rotor iron core 7, as shown in the drawing, a plurality of (4 each in the example shown in the drawing) concentric-circular slits 72 are respectively installed in the peripheral direction for each salient pole. Between neighboring slits 72 in the radial direction, a plurality of (3 each in the example shown in the drawing) bridges 74 are arranged concentric-circularly in the peripheral direction in the same way as with the slits 72. The bridges 74 are structured so that their outer peripheral parts are connected by peripheral bridges 71. The detailed constitution of the peripheral bridges 71 will be described later by referring to FIG. 2. Namely, the peripheral bridges 71 are structured so that they withstand the centrifugal force of the rotor 3 and the rotor iron core 7 is not separated variedly by the respective bridges 74. At both ends of each circular bridge 74 in the peripheral direction in each peripheral bridge 71, a non-magnetic part 75 is installed in contact with the bridge 74. In this embodiment, the slits 72 are internally hollow generally and filled with non-magnetic air. The slits 72 may be filled with a non-magnetic material such as varnish or synthetic resin or a non-magnetic conductive material such as aluminum. Therefore, the slits 72 and the non-magnetic parts 75 which are continuously installed are all non-magnetic and as described later by referring to FIG. 4, they are magnetic barrier areas inside the rotor 3.

A characteristic of this embodiment is that the rotor iron core 7 uses a material that the magnetic part and the non-magnetic part coexist. For convenience, a material in which the magnetic part and the non-magnetic part can coexist is referred to a "composite magnetic material" hereinafter. A composite magnetic material used in this embodiment is a single material in which both magnetic and non-magnetic characteristics can be realized such as metastable austenite series stainless steel of Fe—Ni—Cr series or martensite series stainless steel of Fe—Cr—C series.

Metastable austenite series stainless steel is non-magnetic in an austenite structure (hereinafter, referred to as "γ") which is solution treated, or melted and solidificated, though when it is cold-worked to a martensite structure (hereinafter, referred to as "α'"), it becomes ferromagnetic. Martensite series stainless steel of Fe—Cr—C series becomes ferromagnetic when it is annealed at the A3 critical temperature or lower to a "ferrite (hereinafter, "α"+carbide)" structure and when it is heated at the austenite temperature or more which is higher than the A3 temperature, it becomes "γ" and non-magnetic.

When metastable austenite series stainless steel is to be applied to the rotor iron core 7, for example, general austenite series stainless steel such SUS304 may be used. When the quality guarantee at a temperature lower than the freezing point is required, a material composed of C of 0.60% max., Cr of 12.0 to 19.0%, Ni of 6.0 to 12.0%, Mn of 2.0% max., the remainder of Fe, and unavoidable impurities or a material that the Hirayama's equivalent weight Heq=[Ni %]+1.05 [Mn %]+0.65 [Cr %]+0.35 [Si %]+12.6 [C %] is 20.0 to 23.0%, and the nickel equivalent weight Nieq=[Ni %]+30 [C %]+0.5 [Mn %] is 9.0 to 12.0%, and the chromium equivalent weight Creq=[Cr %]+[Mo %]+1.5 [Si %]+0.5 [Nb %] is 16.0 to 19.0% may be used. These materials are solution treated to "γ" first and then cold-rolled to a predetermined plate thickness so as to produce a ferromagnetic material of α'. The ferromagnetic material is press-cut to obtain the contour of the rotor iron core 7 and slit portion, and the peripheral bridge portion for connecting the slit portion is locally heated using a proper heating source, and the γ structure of non-magnetic. The press process and local non-magnetization process may be performed in the reverse order.

In the case of metastable austenite series stainless steel, the temperature required for non-magnetization is about 800° C. or higher. Therefore, the local non-magnetization method may be a solution treatment within the temperature range from 800° C. to a temperature lower than the fluxing point or a method for heating at the melting point or higher and melting and solidifying. As a heating method, high frequency heating, laser heating, or heating by an electron beam may be used. However, in the rotor iron core of this embodiment, a fine and narrow range is to non-magnetized, so that the fusing and solidifying process by a laser or electron beam is suited.

When martensite series stainless steel is to be applied to the rotor iron core 7, a composite magnetic material can be realized using the phase transformation of a material having a basic composition of, for example, C of 0.30 to 0.80%, Cr of 10.0 to 25.0%, and the remainder of Fe. Concretely, a material which is rolled to a predetermined plate thickness by cold rolling is annealed at 650 to 800° C. so as to be made ferromagnetic and press-cut and the rotor iron core 7 is produced via local non-magnetization. In the case of martensite series stainless steel, the temperature necessary for non-magnetization is 1150° C. or more and it is higher than that of metastable austenite series stainless steel, so that as a heating source of the local non-magnetization process, a laser or an electron beam is suitable.

As compared with a composite magnetic material using metastable austenite series stainless steel, an Fe—Cr—C series composite magnetic material has high saturation magnetic flux density and superior soft magnetic properties.

In both metastable austenite series stainless steel and martensite series stainless steel, an applicable element such as C, N, or Ni affecting stabilization of the magnetic phase and non-magnetic phase and magnetic properties can be added depending on the purpose or the content can be adjusted.

Further, for example, Fe—Cr—C series composite magnetic material is used, in the ferromagnetic part, a further superior soft magnetic characteristic is required, as shown in Japanese application patent laid-open 2000-104142, it can use a composite magnetic characteristic material which is comprised of Fe—Cr—C series alloy containing Al of 0.1–5.0 wt %. When Al is added To Fe—Cr—C series alloy, there are functions for controlling a crystallization diameter, orientations of crystallization, a further carbide morphology etc. The increase of the maximum permeability in the ferromagnetic part and the reduction in the coercive force, namely as Al has an effect of increasing an electrical resistively the effect for deducing the eddy current loss can be obtained.

Further, in Fe—Cr—C series composite magnetic material, since the metal composition for constituting the non-magnetic part is the austenite structure, in the low temperature area which is less than Ms point (the temperature for starting the transformation from the austenite to the martensite), the martensite transformation proceeds, and the magnetic characteristic starts to have slightly. Herein, to improve the characteristic stability against the environment temperature of the non-magnetic part, it is desirable to use the alloy in which the element having the function for lowering Ms point is added to Fe—Cr—C series composite magnetic material. In concretely, it is desirable to employ the composite magnetic material in which Ni is added to Fe—Cr—C series composite magnetic material, as shown in Japanese application patent laid-open Hei 9-157802, or the composite magnetic materials having the chemical composition in which Ni equivalent (=% Ni+30×% C+0.5×% Mn+30×% N) is adjusted within a range of 10.0–25.0% in Fe—Cr—C—Al composite magnetic member, as shown in Japanese application patent laid-open 2000-104142.

It may be structured so as to install rotor iron cores in some of the slits 72, heat them at the austenite critical temperature or higher as mentioned above, then cool so as to make them non-magnetic. The mechanical strength in this case can be increased very much.

Next, the detailed constitution of the outer peripheral part of the rotor iron core 7 of the rotary machine of this embodiment will be explained by referring to FIG. 2. FIG. 2 is a drawing of one of the four salient poles which is enlarged and the other three poles have the same constitution.

The outer peripheral part of the rotor iron core 7 is composed of the peripheral bridges 71, the slits 72 (72*a*, 72*b*, 72*c*, 72*d*), and the bridges 74 (74*a*, 74*b*, 74*c*). The peripheral bridges 71 and the bridges 74 form magnetic paths. In this case, the non-magnetic parts 75 (75*a*, 75*b*, 75*c*, 75*d*) are arranged on the air gap side and the slits 72 are arranged on the opposite side of the air gap side, thus the slits 72 and the non-magnetic parts 75 are continuously formed. By doing this, the non-magnetic parts 75 (75*a*, 75*b*, 75*c*, 75*d*) installed in the peripheral bridges 71 play a roll of blocking the peripheral bypass magnetic path of the rotor 3, that is, function as a magnetic barrier area in the rotor 3. Namely, in the system of this embodiment, the outer periphery is magnetically blocked and the peripheral bridges 71 and the bridges 74 are mechanically connected via the non-magnetic parts 75, so that the thickness of each of the peripheral bridges 71 and the bridges 74 in the radial direction can be increased and a rotary machine which is mechanically strong, that is, can withstand high-speed rotation can be structured.

On the other hand, the magnetic pole center (or salient pole center) of the rotor iron core 7 is a magnetic pole center 73 composed of a magnetic substance and forms a magnetic path and a strong member.

Next, the whole constitution of the rotary machine of this embodiment will be explained by referring to FIG. 3.

The rotor 3 is held by bearings 10 inserted in end brackets 9 and 9' via a shaft 8 inserted in the rotor iron core 7 so as to rotate freely. On the shaft 8 of the rotor 3, a magnetic pole position sensor PS for detecting the position of the rotor 3 and a position sensor E are installed. A stator 2 having a stator iron core 4 and a stator coil 5 is fixed and held between the end brackets 9 and 9'. The constitution indicated here has no frame in the periphery of the stator iron core 4. However, it may use a frame when necessary.

When a 3-phase current is applied to the stator winding 5 according to the position of the rotor detected by the magnetic pole position sensor PS for detecting the position of the rotor 3 and the position sensor E, a rotary magnetic field is generated. Magnetic attraction is generated between the rotary magnetic field and the salient poles of the rotor 3 and continuous turning force is generated. When the current phase is selected properly, an operation at maximum torque can be performed.

As explained above, the characteristic of the reluctance type rotary machine of this embodiment is that, as shown in FIG. 1, a plurality of non-magnetic slits are installed in the rotor 2 in the direction from one magnetic pole (or salient pole) of the rotor 2 to its neighboring magnetic pole and non-magnetic parts are formed in the connections of the peripheral bridges. By doing this, a motor having high mechanical strength and large torque as a reluctance type rotary machine, that is, a reluctance type rotary machine which is small-sized, light in weight, and highly efficient can be obtained.

Next, the operation principle of the reluctance type rotary machine of this embodiment will be explained by referring to FIGS. 4 to 7.

FIGS. 4 to 6 are illustrations showing the principle of a reluctance type rotary machine of an embodiment of the present invention. FIGS. 5 and 7 are illustrations showing the principle of a reluctance type rotary machine of the conventional system. FIGS. 4 to 7 show examples of the circular rotor 3 which is developed in the peripheral direction in a plane. The same numerals as those shown in FIGS. 1 and 2 indicate the same parts.

The reluctance Xd in the d axis is generally proportional to the ratio of the air gap flux amount Φd when the stator winding electromotive force is applied in the direction of the d axis to the supplied current ratio Id (Xd∝Φd·Id). The reluctance Xq in the q axis is also proportional to the ratio of the air gap flux amount Φq when the stator winding electromotive force is applied in the direction of the q axis to the supplied current ratio Iq (Xq∝Φq·Iq).

The generated torque T of the reluctance type rotary machine is expressed by the following Formula (1) from the reluctance Xd in the d axis and the reluctance Xq in the q axis.

$$T \propto (Xd/Xq) \tag{1}$$

The reluctance Xd and Xq are respectively proportional to the inductance Ld when the stator winding electromotive force is applied in the Xd direction and the inductance Lq when the stator winding electromotive force is applied in the Xq direction. Therefore, the torque T is proportional to the ratio Ld/Lq of the inductance in the d axis to the inductance in the q axis.

On the other hand, the inductance L (Ld and Lq) is expressed by the following Formula (2).

$$L = N \cdot \Phi / Ia \tag{2}$$

where N indicates the number of the stator winding, and Φ indicates generated magnetic flux, and Ia indicates the current of the stator winding.

Formula (2) indicates that when the current of the stator winding 5 is the same, the generated magnetic flux Φ and the inductance L are proportional to each other. In a reluctance motor, increasing of the ratio (Xd/Xq) of the reluctance Xd at the magnetic pole center to the reluctance Xq between the magnetic poles results in increasing of the torque, so that by increasing the generated magnetic flux when the stator winding electromotive force is fit to the d axis and decreasing the generated magnetic flux when the stator winding electromotive force is fit to the q axis, the ratio (Xd/Xq) of the reluctance Xd at the magnetic pole center to the reluctance Xq between the magnetic poles can be increased and the torque can be increased.

Firstly, the reluctance of the d axis will be explained by referring to FIGS. 4 and 5.

FIG. 4(A) shows a stator winding electromotive force distribution AT1 when the stator winding electromotive force of the stator winding 5 is applied in the direction of the d axis in the rotary machine of this embodiment shown in FIGS. 1 and 2. In this case, the direction of the d axis indicates the center direction (the direction of the magnetic pole center) of the magnetic pole center part 73.

FIG. 4(B) shows an air gap flux density distribution B1d when the stator winding electromotive force of the stator winding 5 is applied in the direction of the d axis in the rotary machine of this embodiment shown in FIGS. 1 and 2.

FIG. 4(C) shows the position of the rotor when the stator winding electromotive force of the stator winding 5 is applied in the direction of the d axis in the rotary machine of this embodiment shown in FIGS. 1 and 2. Namely, the stator winding electromotive force AT1 is applied in the central direction (the direction of the magnetic pole center) (the direction of the d axis) of the magnetic pole center 73.

As shown in FIGS. 4(A) and 4(C), the magnetic flux amount when the center of the stator winding electromotive force AT1 is fit to the salient pole magnetic core 73 of the rotor is generally decided by the size of the stator iron core tooth portion 42 because the magnetic flux f1dm passing through the bridges 74 of the rotor 3 is large and the magnetic saturation in the stator iron core tooth portion 42 is severe. In this case, the magnetic flux Φd passing the stator includes the magnetic flux f1dl passing the peripheral bridges 71 of the rotor and the magnetic flux f1dm passing the salient pole magnetic core 73 and the bridges 74. However, since the magnetic saturation in the stator iron core tooth portion 42 is severe as mentioned above, the magnetic flux Φd decides depending on the size of the stator iron core tooth portion 42 and becomes almost equal to the reluctance Xd of the d axis.

FIG. 5(A) shows a stator winding electromotive force distribution AT1 when the stator winding electromotive force of the stator winding 5 is applied in the direction of the d axis in a rotary machine of the conventional system. The conventional system, as described in Electric Society, June Issue, 1996, "Magnetic Field Analysis and Prototype Experiment of Flux Barrier Type Reluctance Motor Using Slit Rotor", has a structure that a rotor is composed of a magnetic substance such as a silicone steel plate, and the plate is laminated in the axial direction, and several layers of non-magnetic slits are installed in the direction from the center of one magnetic pole of the rotor to the center of another magnetic pole.

FIG. 5(B) shows an air gap flux density distribution B2d when the stator winding electromotive force of the stator winding 5 is applied in the direction of the d axis in a rotary machine of the conventional system.

FIG. 5(C) shows the position of the rotor when the stator winding electromotive force of the stator winding 5 is applied in the direction of the d axis in a rotary machine of the conventional system. Namely, the stator winding electromotive force AT1 is applied in the central direction (the direction of the magnetic pole center) (the direction of the d axis) of the magnetic pole center 73.

As shown in FIGS. 5(A) and 5(C), the magnetic flux amount when the center of the stator winding electromotive force AT1 is fit to the salient pole magnetic core 73 of the rotor is generally decided by the size of the stator iron core tooth portion 42 because the magnetic flux f2dm passing through the bridges 74 of the rotor 3 is large and the magnetic saturation in the stator iron core tooth portion 42 is severe. In this case, the magnetic flux Φd passing the stator includes the magnetic flux f2dl passing the peripheral bridges 71 of the rotor and the magnetic flux f2dm passing the salient pole magnetic core 73 and the bridges 74. However, since the magnetic saturation in the stator iron core tooth portion 42 is severe as mentioned above, the magnetic flux Φd decides depending on the size of the stator iron core tooth portion 42 and becomes almost equal to the reluctance Xd of the d axis.

Namely, in both the system of this embodiment shown in FIG. 4 and the conventional system shown in FIG. 5, almost the same magnetic flux amount is obtained and almost the same reluctance Xd in the d axis is obtained.

Next, the reluctance of the q axis will be explained by referring to FIGS. 6 and 7.

Figure 6A:
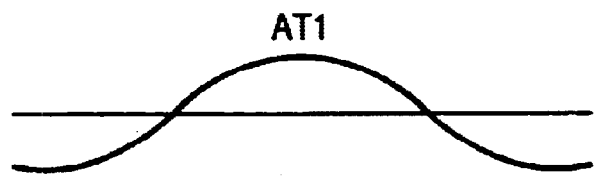
FIG. 6 is an illustration showing the principle of a reluctance type rotary machine of an embodiment of the present invention.

FIG. 6(A) shows a stator winding electromotive force distribution AT1 when the stator winding electromotive force of the stator winding 5 is applied in the direction of the q axis in the rotary machine of this embodiment shown in FIGS. 1 and 2. In this case, the direction of the q axis indicates the intermediate direction of neighboring magnetic pole center parts 73 (the inter-magnetic-pole direction having a phase difference of 90 degrees of an electrical angle from the d axis).

Figure 6B:
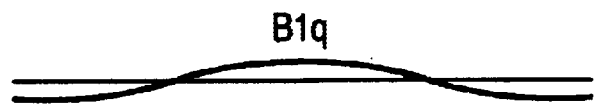

FIG. 6(B) shows an air gap flux density distribution B1$q$ when the stator winding electromotive force of the stator winding 5 is applied in the direction of the q axis in the rotary machine of this embodiment shown in FIGS. 1 and 2.

Figure 6C:
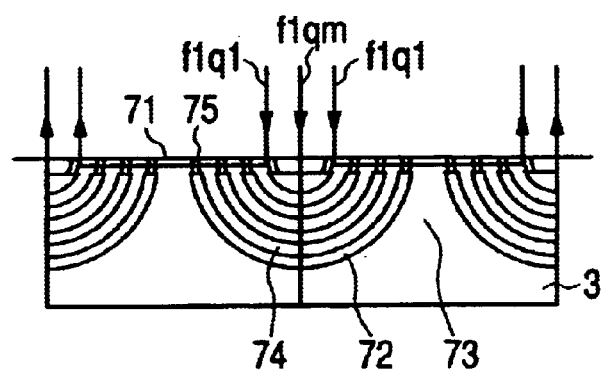

FIG. 6(C) shows the position of the rotor when the stator winding electromotive force of the stator winding 5 is applied in the direction of the q axis in the rotary machine of this embodiment shown in FIGS. 1 and 2. Namely, the stator winding electromotive force AT1 is applied in the intermediate direction (the direction of the q axis) of neighboring magnetic pole center parts 73.

As shown in FIGS. 6(A) and 6(C), when the stator winding electromotive force AT1 is applied in the q axis, the magnetic circuit of the rotor is cut into pieces by the slits 72, so that the magnetic flux f1$qm$ passing the center of the q axis is small and the magnetic flux f1$ql$ passing the peripheral bridges 71 of the rotor is main. However, in this embodiment, the magnetic circuit of the bridges 71 is cut into pieces by the non-magnetic parts 75, so that the magnetic flux f1$ql$ passing the bridges 71 can be suppressed so as to be small. Therefore, the reluctance Xq in the q axis is reduced.

Figure 7A:
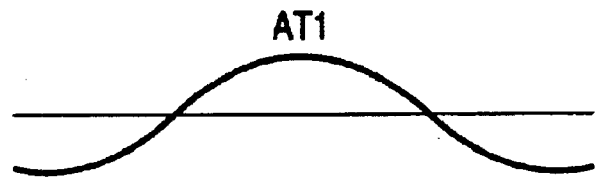
FIG. 7 is an illustration showing the principle of a reluctance type rotary machine of the conventional system.

FIG. 7(A) shows a stator winding electromotive force distribution AT1 when the stator winding electromotive force of the stator winding 5 is applied in the direction of the q axis in a rotary machine of the conventional system.

Figure 7B:
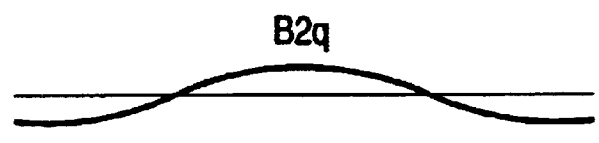

FIG. 7(B) shows an air gap flux density distribution B2$q$ when the stator winding electromotive force of the stator winding 5 is applied in the direction of the q axis in a rotary machine of the conventional system.

Figure 7C:
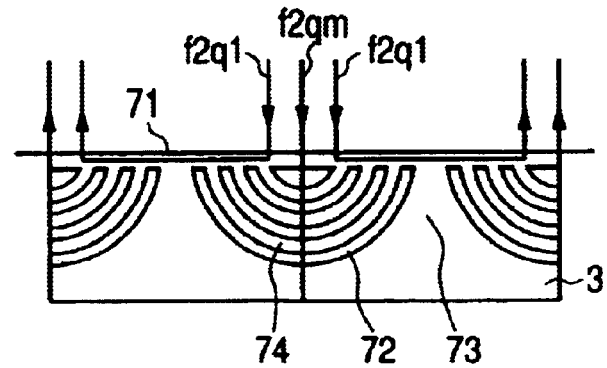

FIG. 7(C) shows the position of the rotor when the stator winding electromotive force of the stator winding 5 is applied in the direction of the q axis in a rotary machine of the conventional system. Namely, the stator winding electromotive force AT1 is applied in the intermediate direction (the direction of the q axis) of neighboring magnetic pole center parts 73.

As shown in FIGS. 7(A) and 7(C), when the stator winding electromotive force is applied in the q axis, the magnetic circuit of the rotor is cut into pieces by the slits 72, so that the magnetic flux f2$qm$ passing the center of the q axis is small and the magnetic flux f2$ql$ passing the peripheral bridges 71 of the rotor is main. In this case, the magnetic flux f2$ql$ passing the peripheral bridges 71 of the rotor of the conventional system is increased to a value when magnetic saturation is generated in the bridges 71. Therefore, in the conventional system, the reluctance of the q axis is comparatively increased.

As mentioned above, to increase the torque, it is desirable to increase the ratio (Xd/Xq) of the reluctance Xd at the magnetic pole center to the reluctance Xq between the magnetic poles. However, although the reluctance Xd at the magnetic pole center is not different between this embodiment and the conventional system, the reluctance Xq between the magnetic poles in this embodiment can be made smaller than that of the conventional system by installing the non-magnetic parts 75. Therefore, according to this embodiment, Xd/Xq can be increased and high torque can be produced.

Next, comparison of the rotary machine of this embodiment with a rotary machine having a constitution that as described in Japanese Patent Application Laid-Open 9-93885, to ensure the mechanical strength which is a defect of a flux barrier type reluctance motor, a material that the ferromagnetic part and non-magnetic part coexist is used will be explained. This comparison is a comparison with a constitution that the bridge portion 71 of this embodiment is replaced with a non-magnetic part.

In this case, the mechanical strength is decided by the thickness of the bridge portion 71 in the radial direction, so that it may be made almost equal in the conventional system and this embodiment. On the other hand, in the conventional system, the magnetic flux passing the bridge portion 71 can be made smaller in the same way as with this embodiment. However, the magnetic flux f2$qm$ passing the center of the q axis is increased because the magnetic permeability of the non-magnetic parts 75 cannot be reduced to that of air. On the other hand, in this embodiment, the magnetic permeability of the slit portion 72 is reduced to that of air, thereby the magnetic flux f2$qm$ passing the center of the q axis can be reduced. By doing this, Xd/Xq can be increased and high torque can be produced.

To decrease the magnetic flux f2$qm$ passing the center of the q axis, it is necessary to widen the width of the slits 72 in the radial direction. However, on the other hand, to widen the width of the slits 72 in the radial direction, in the conventional system, a laser of a large capacity is required so as to make the part non-magnetic. On the other hand, in this embodiment, only press-cutting is performed, thus the laser power capacity can be reduced and the productivity can be improved.

The form and number of slits and bridges may be selected optionally. The stator may be distributed winding or concentrated winding.

As explained above, according to this embodiment, the rotor iron core is composed of a material that the ferromagnetic part and non-magnetic part coexist and structured so as to have the slit portion constituting the magnetic salient poles of the rotor and the magnetic barrier areas are installed by the slits and non-magnetic parts, so that a highly efficient reluctance type rotary machine having high torque can be obtained.

Next, the constitution and operation of the rotary machine of the second embodiment of the present invention will be explained with reference to FIGS. 8 and 9.

Figure 8:
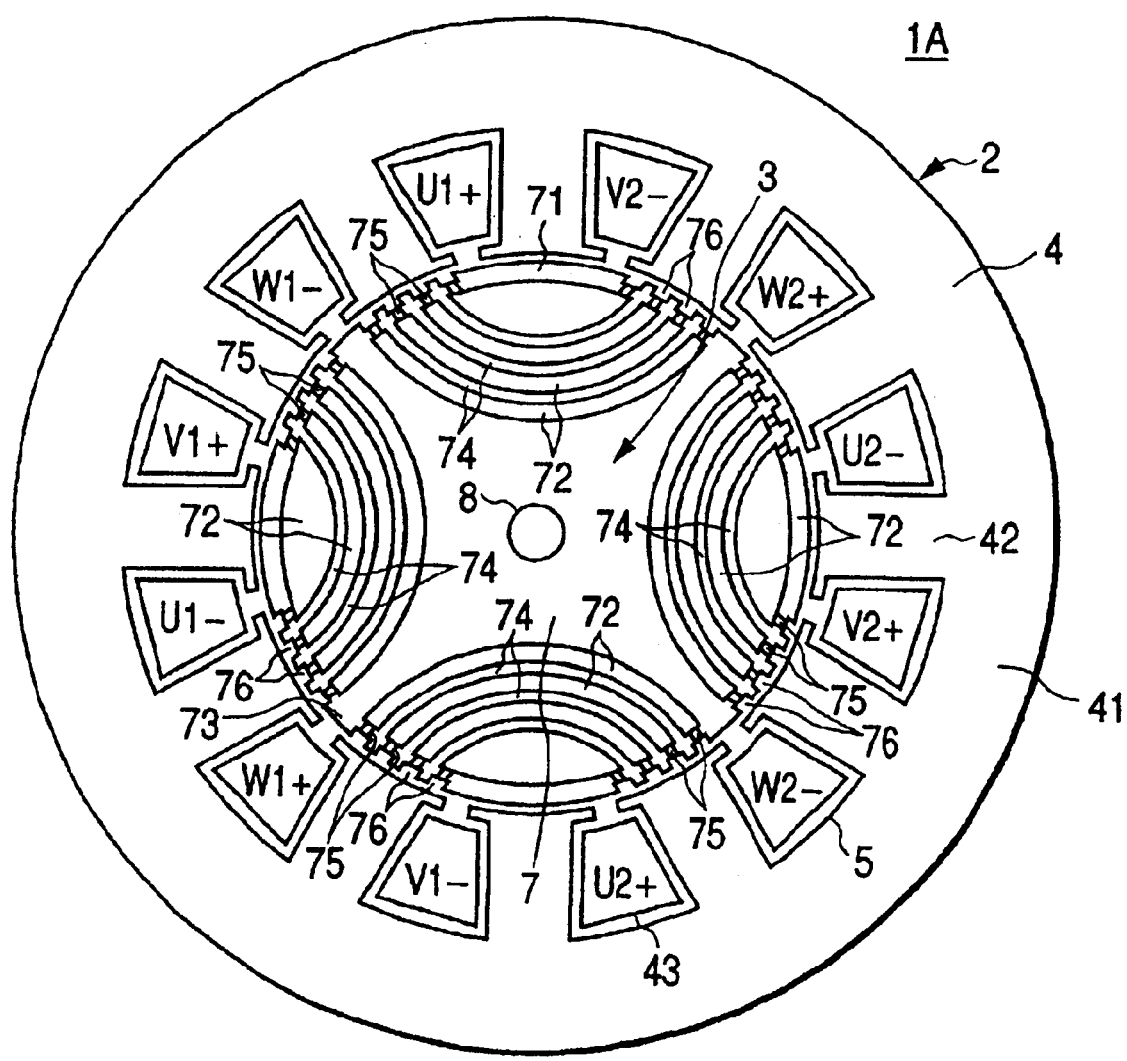
FIG. 8 is a cross sectional view showing the constitution of a rotary machine of the second embodiment of the present invention.
Figure 9:
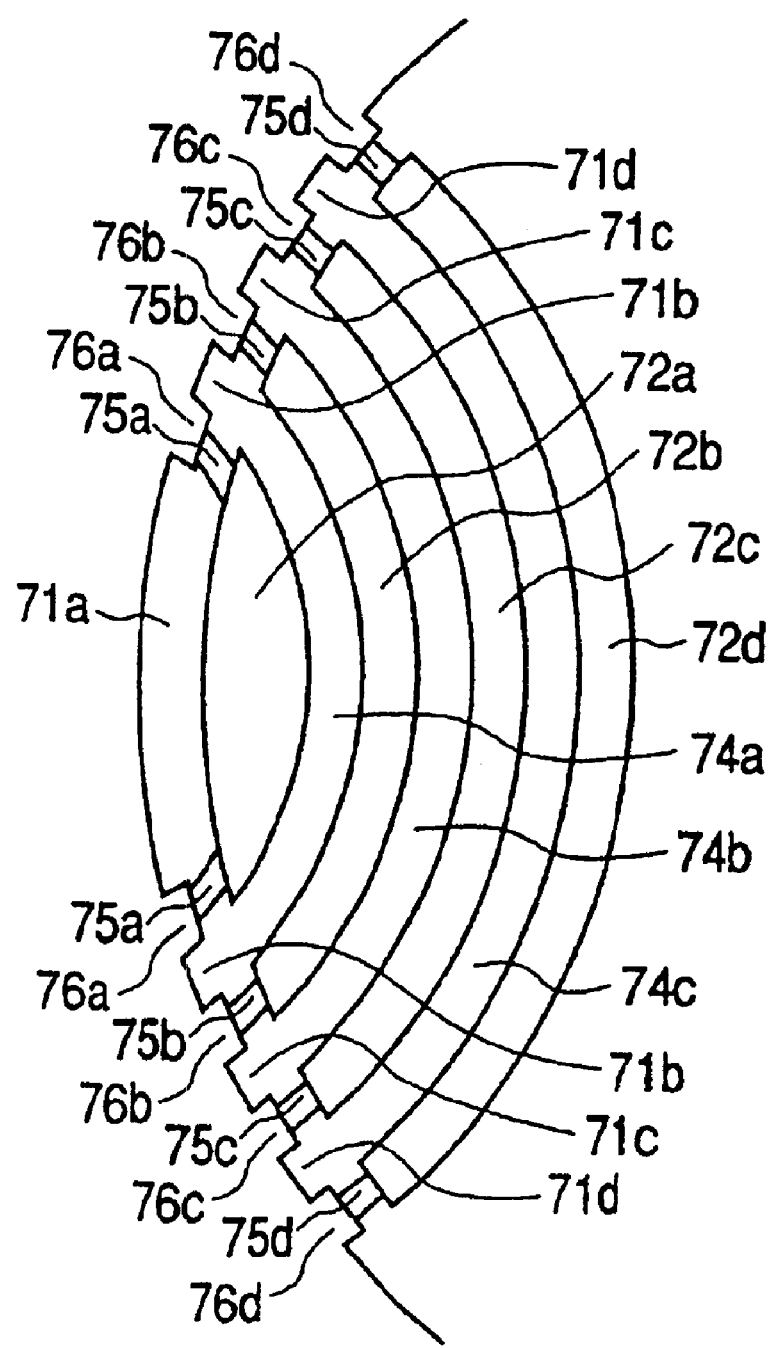
FIG. 9 is an enlarged view of the essential section of FIG. 9.

FIG. 8 is a cross sectional view showing the constitution of the rotary machine of the second embodiment of the present invention and FIG. 9 is an enlarged view of the essential section shown in FIG. 8. The same numerals as those shown in FIGS. 1 and 2 indicate the same parts.

The characteristic of the reluctance motor of this embodiment is that non-magnetic part concavities 76 are installed in the peripheral part of the non-magnetic parts 75 positioned in the outer periphery of the reluctance type rotary machine. According to this embodiment, for example, the part to be non-magnetized of a material having a ferromagnetic tissue is heated at the austenite critical temperature or higher and then cooled or heated and fused at the melting point or higher and then cooled and solidified, thereby a rotor iron core that the ferromagnetic part and non-magnetic part coexist in the same material is formed. Irradiation of a laser is used for heating and fusion. However, a problem may arise that the rotor iron core 7 is deformed or partially protruded due to fusion. In the rotary machine 1, the air gap between the rotor 3 and stator 2 is short in length, so that when the rotor 3 is deformed, there is the possibility that the rotor 3 comes in contact with the stator 2 and cannot rotate.

Therefore, in this embodiment, in the part (non-magnetic parts 75) of the outer periphery of the rotor 2 which is heated and deformed by a laser, hollowed non-magnetic surface concavities 76a, 76b, 76c, and 76d are installed on the inner diameter side from the outmost periphery of the rotor to be irradiated. By doing this, even if deformation or partial protrusion may occur due to fusion by heating, it can be suppressed so long as the rotor can rotate. FIG. 8 shows an example of an internally rolling type rotary machine. However, it may be generally of an externally rolling type, thus the air gap side non-magnetic surface is hollowed on the opposite side of the air gap portion.

As explained above, according to this embodiment, a highly efficient reluctance type rotary machine having high torque can be obtained and a rotative rotary machine can be obtained regardless of heating and fusion during forming of non-magnetic parts.

Next, the constitution and operation of the rotary machine of the third embodiment of the present invention will be explained with reference to FIGS. 10 and 11.

Figure 10:
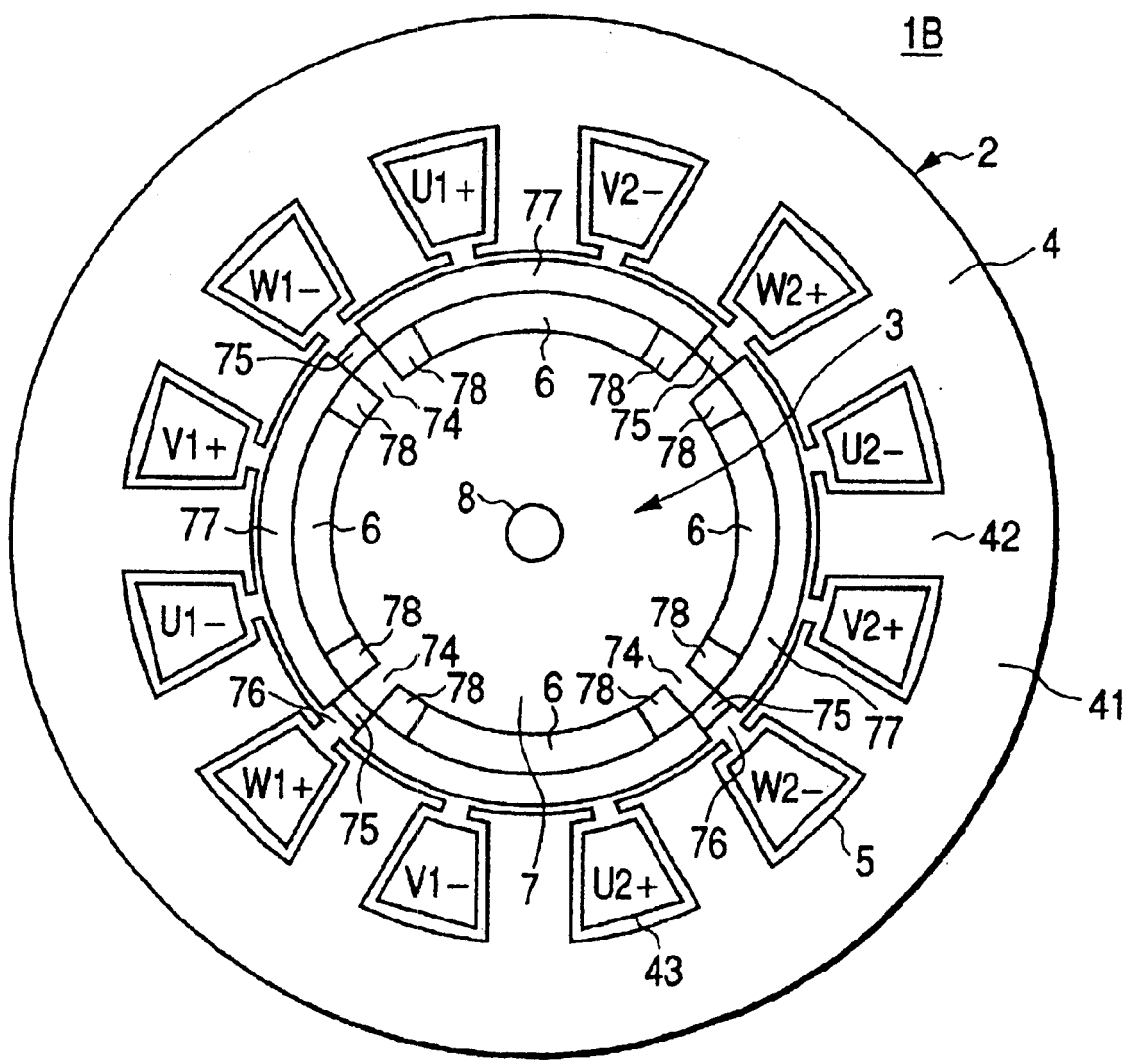
FIG. 10 is a cross sectional view showing the constitution of a rotary machine of the third embodiment of the present invention.

FIG. 10 is a cross sectional view showing the constitution of the rotary machine of the third embodiment of the present invention and FIG. 11 is a process diagram showing the manufacturing process of a rotor of this embodiment. The same numerals as those shown in FIGS. 1 and 2 indicate the same parts.

The characteristic of the reluctance motor of this embodiment is that permanent magnets 6 are arranged in a part of the rotor. By doing this, the defects of the reluctance type rotary machine against a permanent magnet rotary machine, for example, small torque and a low power factor can be improved.

In FIG. 10, windows for housing the permanent magnets 6 are press-cut in the rotary iron core 7 having a material that the magnetic part and non-magnetic part coexist and the permanent magnets 6 are housed in the windows. The length of each permanent magnet 6 in the peripheral direction is shorter than the length of each window in the peripheral direction, so that magnet end air gaps 78 are formed at both ends of each permanent magnet 6. In the periphery of each permanent magnet 6, a magnetic pole piece 77 constituting the magnetic path of each permanent magnet 6 is arranged. The magnetic pole pieces 77 are integrated with the bridges 74 via the non-magnetic parts 75.

In this case, for non-magnetization of the non-magnetic parts 75, in the same way as with the aforementioned method, the non-magnetic parts 75 are heated at the austenite critical temperature or higher by irradiation of a laser and then cooled or heated and fused at the melting point or higher and then cooled and solidified, thereby the ferromagnetic parts are changed to non-magnetic parts.

Next, the manufacturing process will be explained by referring to FIG. 11.

Figure 11A:
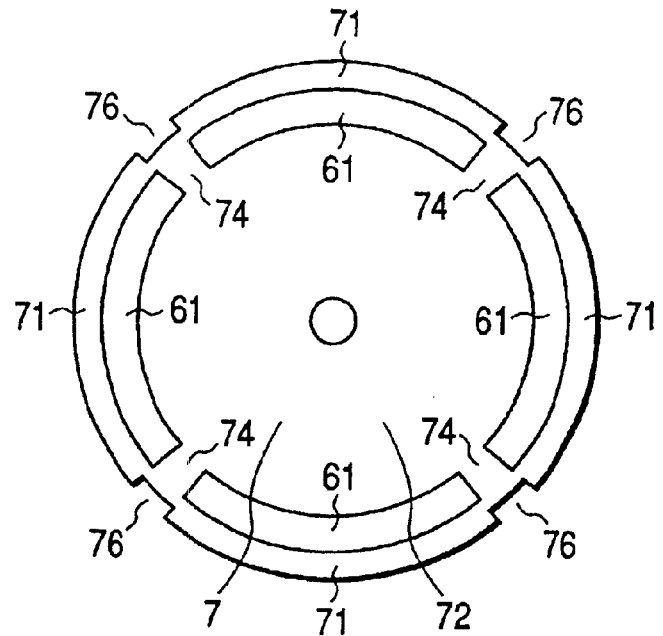
FIG. 11 is a process drawing showing the manufacturing process of the rotor of the third embodiment of the present invention.

As shown in FIG. 11(A), windows 61 for inserting the permanent magnets 6 and non-magnetic surface concavities 76 are formed by the press-cutting operation of the rotor iron core 7.

Figure 11B:
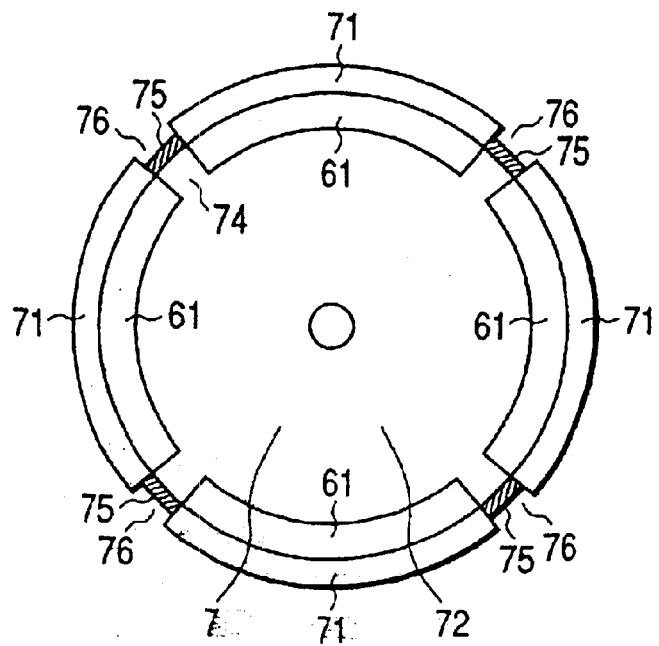

Next, as shown in FIG. 11(B), the non-magnetic parts 75 are formed by the non-magnetization operation.

Next, the permanent magnets 6 are inserted into the windows 61 and magnetized and side plates for preventing the magnets from projecting in the axial direction are prepared when necessary.

As mentioned above, the non-magnetization operation is performed after the press-cutting operation for the rotor iron core 7 and then the permanent magnets 6 are inserted and magnetized, thereby the rotor can be assembled free of an effect on the permanent magnets 6.

As mentioned above, the non-magnetic surface concavities 76 are formed in the periphery of the bridges 74 and the non-magnetic parts 75, thereby deformation or partial projection of the non-magnetic parts 76 due to fusion by heating can be suppressed so long as the rotor can rotate. Further, leakage flux from the permanent magnets 6 to the permanent magnet of another pole via the non-magnetic parts 76 can be prevented by the non-magnetic parts 76. When the thickness of the non-magnetic parts 76 and the width of the bridges 74 are properly selected, a constitution withstanding high-speed rotation can be obtained.

Next, the constitution of an electric car using the reluctance type rotary machine of this embodiment will be explained by referring to FIG. 12.

Figure 12:
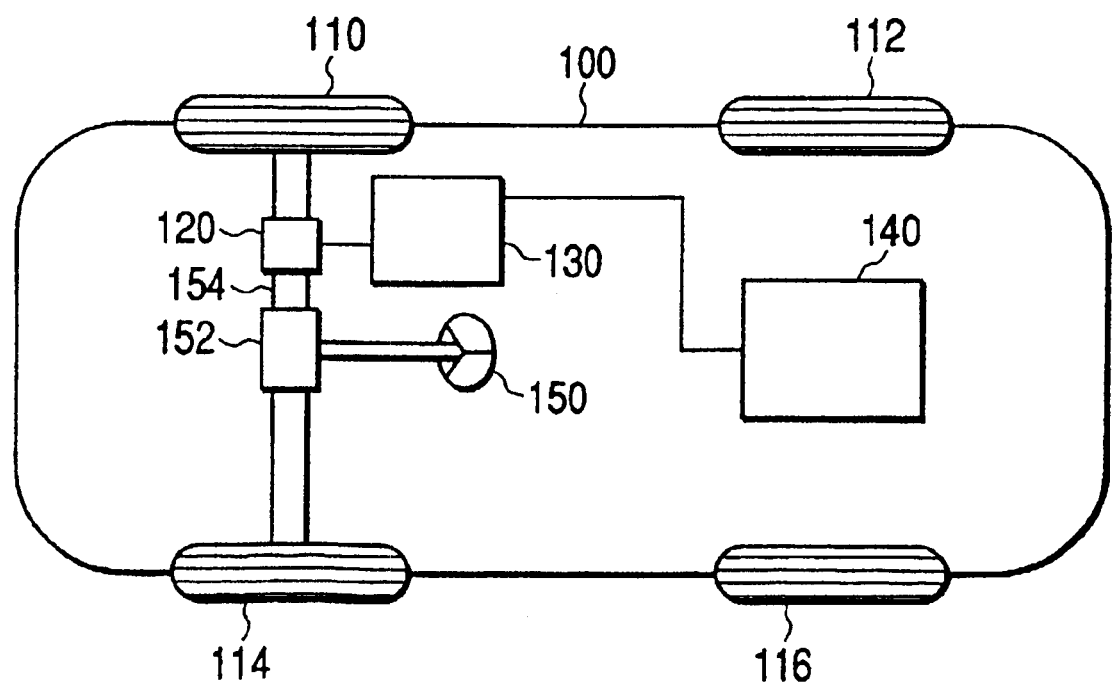
FIG. 12 is a block diagram showing the constitution of an electric car using the reluctance type rotary machine of this embodiment.

FIG. 12 is a block diagram showing the constitution of an electric car using the reluctance type rotary machine of this embodiment.

A frame 100 of the electric car is supported by four wheels 110, 112, 114, and 116. The electric car shown in the drawing is front-wheel-driven, so that a reluctance type rotary machine 120 is directly connected to a front axle 154. The constitution of the reluctance type rotary machine 120 is as shown in FIGS. 1 to 3, 8, 9, and 10. In the constitution of the reluctance type rotary machine 120, the drive torque is controlled by a controller 130. As a power source of the controller 130, a battery 140 is prepared. The power is supplied to the reluctance type rotary machine 120 from the battery 140 via the controller 130, and the reluctance type rotary machine 120 is driven, and the wheels 110 and 114 rotate. The rotation of a handle 150 is transferred to the two wheels 110 and 114 via a transfer mechanism composed of a steering gear 152, a tie-rod, and a knuckle arm and changes the angle of the wheels.

As mentioned above, the reluctance type rotary machine of this embodiment which is small-sized, light in weight, and highly efficient is mounted in an electric car, thereby the travel distance of one charging can be extended and the acceleration performance can be improved.

In the above explanation, the reluctance type rotary machine is used to drive the wheels of an electric car. However, it can be applied to drive the wheels of an electric locomotive.

It can be also applied to a hybrid electrical vehicle having a hybrid drive mechanism by an engine and a motor or an engine starting device which is arranged between the engine and the drive mechanism and used to start the engine and generate power. In this case, the drive unit of a hybrid car be miniaturized and the fuel consumption rate of the system can be reduced.

The rotary machine of this embodiment can be applied to an air conditioner drive motor, which is a highly efficient motor. The rotor uses neither magnet nor aluminum, so that it is a rotary machine suited to recycle.

As mentioned above, this embodiment can provide a reluctance type rotary machine which is small-sized, light in weight, and highly efficient, an electrical vehicle using it for realizing a longer travel distance of one charging, an engine starting and power generating device of high fuel cost efficiency, a hybrid type electrical vehicle, and others.

The present invention can sufficiently increase the produced torque of a rotary machine, improve the mechanical strength during high-speed running, and extend the travel distance of one charging of an electrical vehicle.

What is claimed is:

1. A rotary machine comprising a rotor having magnetic poles and a stator having a stator yoke portion constituting an iron core both tooth portion would by a stator winding and a flux flow path of said magnetic poles, wherein said rotor is a metallic material having a ferromagnetic portion and a non-magnetic portion as an integral member, said rotor has a magnetic barrier area for blocking a bypath magnetic path in a periphery of said rotor, said magnetic barrier area constitutes magnetic air gaps formed by a slit portion and said non-magnetic portions of said metallic material which are arranged from said slit portion to a surface of said rotor, and said non-magnetic portions of said metallic material are formed according to a phase transformation by heating of a metallic element material and said transformed metallic organization is formed with an austenite structure, wherein said slit portion constitutes magnetic salient poles of said rotor, said non-magnetic portions are positioned on a magnetic air gap side of said rotor, and said slit portion is arranged on an opposite side of said magnetic air gap of said rotor.

2. A rotary machine according to claim 1, wherein said rotor is formed of a plurality of laminated iron plates oriented in a rotation axial direction, wherein each iron plate is formed as an integral metallic member comprised of a ferromagnetic portion and a non-magnetic portion constituting a single member.

3. A rotary machine according to claim 2, wherein said magnetic barrier area is formed by magnetic air gaps formed by a slit portion and said non-magnetic parts of said metallic material which are arranged from said slit portion to a surface of said rotor.

4. A rotary machine according to claim 1, wherein each said magnetic barrier area is formed in said rotor.

5. A rotary machine according to claim 1, wherein said slit portion and said non-magnetic portions are formed continuously.

6. A rotary machine according to claim 1, wherein a periphery of said non-magnetic portions on said magnetic air gap side has a concavity smaller than an outermost periphery of said rotor.

7. A rotary machine according to claim 1, wherein said rotor has a permanent magnet as a part of said rotor.

8. A rotary machine according to claim 1, wherein said slit is provided for directing from one magnetic pole of said rotor to an adjacent magnetic pole and is formed of a plurality of laminated iron plates oriented in a rotation axial direction, wherein each iron plate is formed as an integral metallic member comprised of a ferromagnetic portion and a non-magnetic portion constituting a single member, an inner portion of said slit is formed with a cave or is filled up by a material having a non-magnetic characteristic.

9. A rotary machine according to claim 1, wherein said non-magnetic portion of said integral metallic member is formed according to a transformation of a metallographic structure.

10. A rotary machine according to claim 8, wherein said non-magnetic portion of said integral metallic member is formed according to a transformation of a metallographic structure.

11. A rotary machine according to claim 1, wherein said plural inner portion magnetic barrier areas are formed in said rotor.

12. A rotary machine according to claim 1, wherein said slit portion and said non-magnetic portion are formed continuously.

13. A rotary machine according to claim 1, wherein a concavity smaller than an outermost periphery of said rotor is provided on a periphery of said non-magnetic portions on said magnetic air gap side.

14. A rotary machine according to claim 1, wherein a permanent magnet is a part of said rotor.

15. An electric vehicle using a rotary machine for driving wheels, comprising a rotor having magnetic poles and a stator having a stator yoke portion constituting an iron core both tooth portion wound by a stator winding and a flux flow path of said magnetic poles, wherein said rotor is a metallic material having a ferromagnetic portion and a non magnetic portion as an integral member, said rotor has a magnetic barrier area for blocking a bypath magnetic path in a periphery of said rotor, said magnetic barrier area is formed by magnetic air gaps formed by a slit portion and said non-magnetic parts of said metallic material which are arranged from said slit portion to a surface of said rotor, and said non-magnetic portions of said metallic material are formed according to a phase transformation by heating of a metallic element material and said transformed metallic organization is formed with an austenite structure.

16. An electrical vehicle fusing a rotary machine according to claim 15, wherein said rotor is formed of a plurality of laminated iron plates oriented in a rotation axial direction, wherein each iron plate is formed as an integral metallic member comprised of a ferromagnetic portion and a non-magnetic portion constituting a single member, and said magnetic barrier area is formed by magnetic air gaps formed by a slit portion and said non-magnetic parts of said metallic material which are arranged from said slit portion to a surface of said rotor.

17. An electrical vehicle using a rotary machine according to claim 16, wherein said non-magnetic portion of said integral metallic member is formed according to a transformation of a metallographic structure.

* * * * *

UNITED STATES PATENT AND TRADEMARK OFFICE
CERTIFICATE OF CORRECTION

PATENT NO.   : 6,849,983 B2
DATED        : February 1, 2005
INVENTOR(S)  : Tajima et al.

It is certified that error appears in the above-identified patent and that said Letters Patent is hereby corrected as shown below:

<u>Title page,</u>
Item [30], Foreign Application Priority Data, replace "2002" with -- 2000 --.

Signed and Sealed this

Seventeenth Day of May, 2005

JON W. DUDAS
*Director of the United States Patent and Trademark Office*